READER FOR INFORMATION CARRIERS IN SHEET FORM

Filed Nov. 12, 1969 6 Sheets-Sheet 1

MANFRED LEUTWEIN
HEINZ STREICHER
INVENTORS

BY R. Lewis Gable
Robert W. Hampton
ATTORNEYS

READER FOR INFORMATION CARRIERS IN SHEET FORM

Filed Nov. 12, 1969 6 Sheets-Sheet 2

MANFRED LEUTWEIN
HEINZ STREICHER
INVENTORS
BY R. Lewis Gable
Robert W. Hampton
ATTORNEYS

READER FOR INFORMATION CARRIERS IN SHEET FORM

MANFRED LEUTWEIN
HEINZ STREICHER
INVENTORS

BY R. Lewis Gable
Robert W. Hampton
ATTORNEYS

MANFRED LEUTWEIN
HEINZ STREICHER
INVENTORS

BY R. Lewis Gable
Robert W Hampton
ATTORNEYS

MANFRED LEUTWEIN
HEINZ STREICHER
INVENTORS

BY R. Lewis Gable
Robert W Hampton
ATTORNEYS

READER FOR INFORMATION CARRIERS IN SHEET FORM

Filed Nov. 12, 1969

MANFRED LEUTWEIN
HEINZ STREICHER
INVENTORS

BY R. Lewis Gable
Robert W Hampton
ATTORNEYS 3,671,116
READER FOR INFORMATION CARRIERS IN SHEET FORM Manfred Leutwein, Rommelshausen, and Heinz Streicher, Echterdingen, Germany, assignors to Eastman Kodak Company, Rochester, N.Y.

Filed Nov. 12, 1969, Ser. No. 875,792
Claims priority, application Germany, Dec. 19, 1968, P 18 15 762.5
Int. Cl. G03b *23/08*
U.S. Cl. 353—27 16 Claims

ABSTRACT OF THE DISCLOSURE

Apparatus is disclosed for projecting images from information bearing media such as microfiche cards having at least first, second and third image portions, the projection apparatus including first and second stations (or magazines) for receiving a plurality of the image bearing media, a feed path disposed between the first and second stations, first and second projection stations for receiving one of the information bearing media as it is directed along the feed path, and first and second projection assemblies disposed with respect to one of the projection stations for projecting the first and second images from the information bearing medium. In a preferred embodiment, the first and second image portions may be displayed upon a projection screen and one of the lens systems may be movable with respect to the information bearing medium to thereby project the third image portion.

CROSS REFERENCES TO RELATED APPLICATIONS

References are made to commonly assigned copending U.S. application Ser. No. 875,791, entitled "Reader for Information Carriers in Sheet Form," filed Nov. 12, 1969 in the names of Manfred Leutwein, Heinz Streicher and Siegfried Riek; to commonly assigned copending U.S. application Ser. No. 875,815, entitled "Reader for Information Carriers in Sheet Form," filed Nov. 12, 1969 in the names of Heinz Streicher, Siegfried Riek and Manfred Leutwein; and to commonly assigned copending U.S. application Ser. No. 29,212, entitled "Viewer," filed Apr. 16, 1970, in the name of Ulrich Staiger, based on German patent application P 19 31 648.4.

BACKGROUND OF THE INVENTION

Field of the invention

This invention relates to apparatus for projecting images derived from an information bearing media or carrier such as microfiche cards and in particular, to such projection apparatus for projecting images from more than one information bearing media and for displaying these images onto a screen(s) next to each other.

Description of the prior art

Projection viewers or readers of the type for projecting images from information bearing media onto a display surface are known in the art as exemplified by German Pat. No. 1,226,331. This patent discloses projection apparatus having a projection station disposed between first and second magazines for serving as a supply magazine and as a deposit magazine for the information bearing media. The information bearing media are successively moved by a transport belt from the supply magazine to the projection station, and then into the deposit magazine. The projection station is mounted for sliding movement so as to dispose each individual microfilm image portion arranged in a single row on the information bearing medium into the center of the display screen. More particularly, the projection station is mounted for successive movement along two axes disposed at right angles to each other and in a plane which is parallel to the surface of the information bearing medium.

Further, French Pat. 901,705 discloses a viewer or reader which is not restricted to receiving information bearing media having image portions arranged in a single row. In this reader, a projection lens is arranged on one side of the information bearing media and an illumination system including an aperture mask is disposed on the other side so as to be displaceable along two axes which are perpendicular to each other so that any section or portion of the information bearing medium can be projected onto the screen as an individual image.

These known readers project enlarged images onto a display screen of but a single partial image, i.e. an image portion of a plurality of similar images disposed on a single information bearing medium or carrier. As a result, it is difficult if not impossible to change the sequence of the stack or media placed in the input station. Further, it is difficult to transfer the image bearing media or cards after they have been placed in the deposit magazine or to simultaneously project more than one image from a single medium onto a display screen. However, apparatus is known such as described in French Pat. 54,403 which are capable of simultaneously projecting images from an information bearing medium onto a projection screen. However, the projection apparatus described in French Pat. 54,403 receives the information bearing medium in a form of a roll of photographic film upon which information portions or frames are stored. Therefore, it is necessary to use two rolls of film and separate drive means for moving the coils. Further, it is necessary to record the same information on both reels or to place the textual material onto one film strip and the illustrative material such as drawings onto the other film-strip. Therefore, such a viewer is not adapted to receive information bearing media such as microfiche which has recognized advantages, such as the ability to readily update the stored material, over the information carriers which take the form of filmstrips stored in reels.

Many requirements which should be met by readers are in practice unsatisfactorily fulfilled by the readers or viewers described above. For example, literature in the fields of science, technology and patents take the form of a text or specification portion and an illustrative portion including drawings, formulas or the like related to the text portion. In order to appropriately understand the contents of the stored information, it is not only desirable but indeed often necessary to view the text portion and the illustrative portion in a contiguous relationship so that the observed may readily direct his attention from the text to the illustrative portions. This problem is especially acute in the study of patent literature which typically takes the form of a series of drawings and a text or specification portion which describes the elements shown in the drawings by number. In order to fully understand the information being conveyed by the patent it is highly desirable to be able to readily refer to the drawings and the specifications at the same time. Often in reading a patent it is necessary to disassemble the pages of the specifications and drawings so that the related pages may be placed together in a side by side relationship. It is rare that the text and illustrative portions will be found together on the same page. Rather the text and the illustrative portions will be normally found on different pages and in addition, the several pages of text may relate to a single drawing or several sheets of drawings may relate to a single page of text. In addition, there may be many pages of text and drawings so that, taken together or separately, they exceed the space available on a single sheet or microfiche card of the information bearing medium to record the desired information, thus requiring several sheets or microfiche cards to record the entire material. In recording images from these information sources onto the information bearing media, such as microfiche cards, the pages of the document are successively photographed in a defined manner on the microfiche card, for example in rows and columns. As a result, the illustrative portion and the descriptive text portion may not be found on successive images or portions of the microfiche card and it may be difficult to accurately access the related portions of the microfiche card or strip. In such cases, reading microfiche information obtained on carriers or media such as microfiche cards may be found to be difficult, time consuming and unsatisfactory for the viewer.

It is therefore the principal object of this invention to enable images from different portions of an information bearing medium and from different media to be projected onto a display surface(s) and to permit ready observation and comparison of the displayed information.

SUMMARY OF THE INVENTION

This and other objects are met in accordance with teachings of this invention by providing apparatus for projecting images from information bearing media having at least first, second and third image portions. The projection apparatus includes first and second stations for receiving a plurality of information bearing media, a feed path disposed between the first and second stations, first and second projection stations for receiving one of the information bearing media as it is directed along the feed path, and first and second lens assemblies disposed with respect to the first projection station for projecting images from the first and second image portions of one information bearing media. A third lens assembly or system may be disposed to project images derived from another information bearing medium disposed at the second projection station. In a preferred embodiment, a display screen (or screens) may be provided to receive the images from the first, second and third lens means so that the operator or observer may easily compare images from different portions of a single medium and from different media.

In another embodiment of this invention, an additional storage chamber or station may be provided for receiving a third stack of information bearing media and may be disposed between the first and second projection stations to receive information bearing media from the feed path.

The invention, and its objects and advantages, will become more apparent in the detailed description of the preferred embodiments presented below.

BRIEF DESCRIPTION OF THE DRAWINGS

In the detailed description of the preferred embodiment of the invention as presented below, reference is made to the accompanying drawing, which.

DESCRIPTION OF THE PREFERRED EMBODIMENTS

Figure 1:
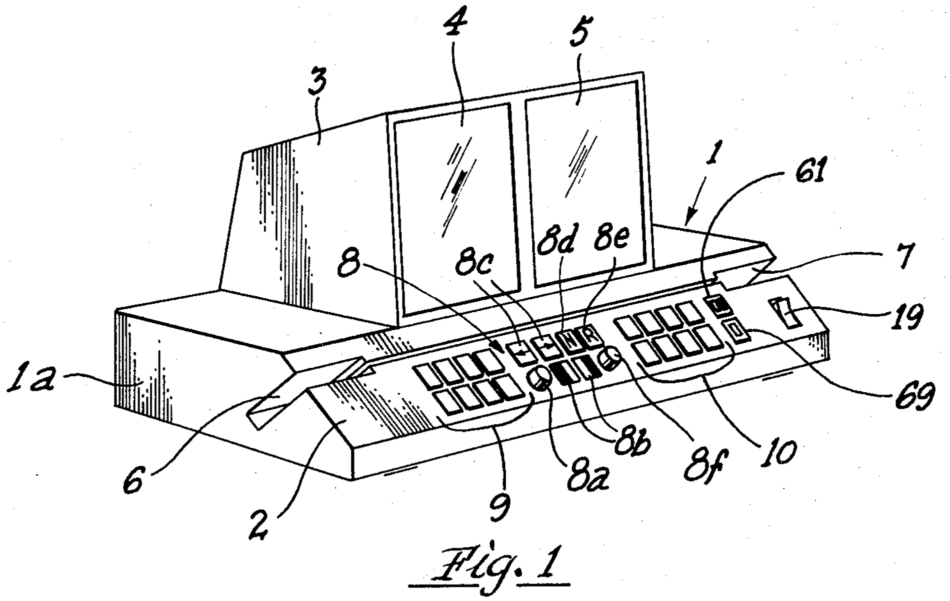
FIG. 1 is a perspective view of a reader incorporating the teachings of this invention.
Figure 3:
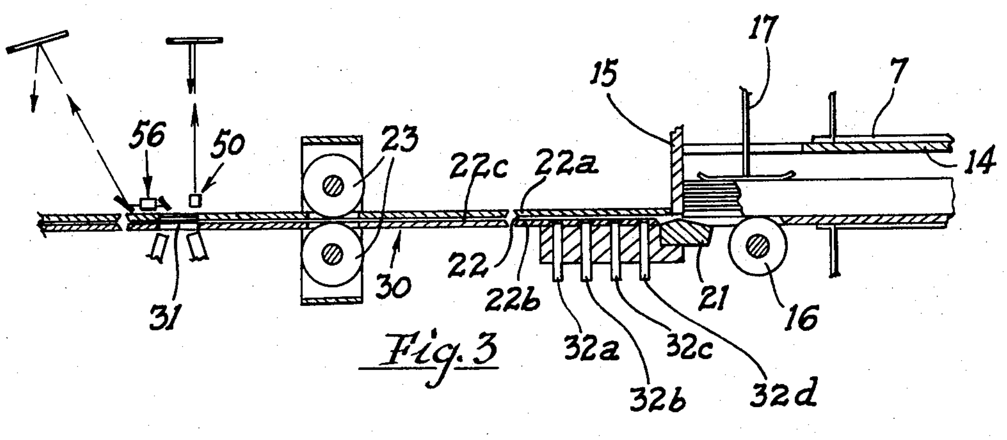
FIGS. 3, 4 and 5 are side, sectioned views of the feed path between input and output stations (or recesses) of the reader as shown in FIG. 1.
Figure 5:
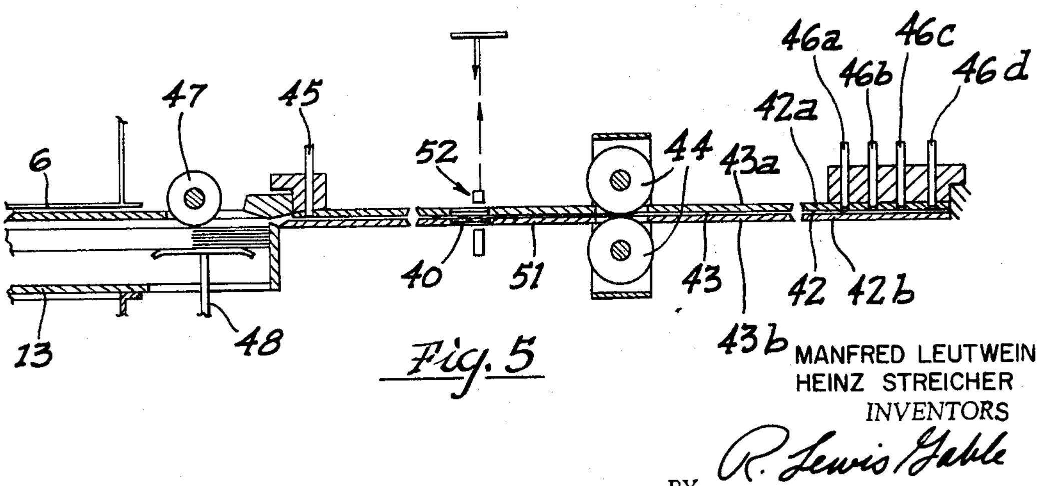

With reference now to the drawings and in particular to FIG. 1, there is shown a reader or viewer 1 including a base portion 1*a* having a forwardly sloping control panel 2 and a top portion 3, the front wall of which is formed by two viewing screens or display surfaces 4 and 5. The base portion 1*a* is provided with a pair of rectangularly shaped recesses *b* and *t* at either end of the control panel 2 to define a feed path therebetween. The recesses 6 and 7 are accessible from the exterior of the reader 1 and are adapted to receive information bearing media such as aperture cards 11. Preferably, the recesses 6 and 7 are so shaped or are provided with several blocking members to prevent the aperture cards 11 received therein from falling out of the recesses 6 and 7. The media 11 may be inserted in the recesses 6 and 7 in the form of loose stacks or may be first loaded into a pair of magazines 13 and 14 (see FIGS. 3 and 5). The use of magazines 13 and 14 is particularly advantageous because they not only protect the aperture cards 11 against damage but also allow the cards 11 to be stored in a systematic order. Preferably, the magazines 13 and 14 should be so configured and dimensioned to have a storage capacity of approximately 100 to 200 aperture cards. As shown in FIGS. 3 and 5, the magazines 13 and 14 have apertures through the walls thereof so that the aperture cards 11 may be engaged by transport rollers 16 and 47 to thereby withdraw or insert the aperture cards 11 from or into the magazines 13 and 14.

Figure 2:
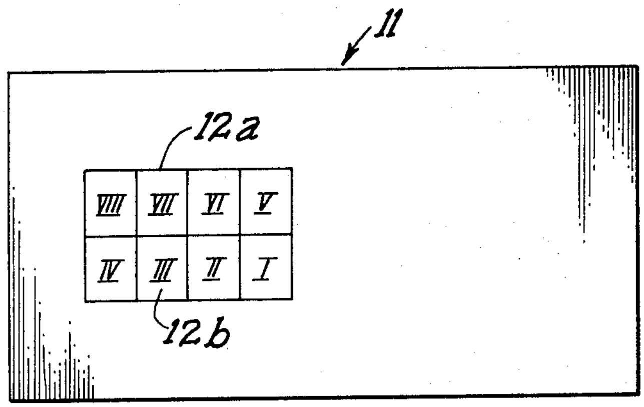
FIG. 2 is a plan view of an information bearing medium in the form of a microfiche card which may be inserted in and displayed by the reader of FIG. 1.

The information bearing media, which takes the form of the aperture cards 11, may differ widely in the material of which they are made, their size and shape and the manner in which the area of each sheet is subdivided. In general, however, the information bearing media should preferably be of uniform size. In the illustrative embodiment shown in FIG. 2, the aperture card 11 may be of a rectangular configuration and be made of a paper having a predetermined stiffness. Further, the card 11 may have an aperture or window 12*a* therein for receiving an information bearing medium in the form of a film chip 12*b* mounted therein by suitable means. As shown in FIG. 2, the film chip 12*b* may have a plurality of image portions or frames I to VIII arranged in rows and columns thereon. In a preferred mode of operation of the reader 1, the transport mechanism to be described may be adapted to dispose the image portion I (or other selected image) of the film chip 12*b* at a reading station so as to be projected onto one of the display screens 4 or 5. The blank space on the aperture card 11 may be used for taking notes or for coding to indicate the subject matter of the information stored upon the film chip 12*b*. For example, coding apertures may be punched in the aperture card 11 to be sensed or read off by suitable apparatus.

Figure 4:
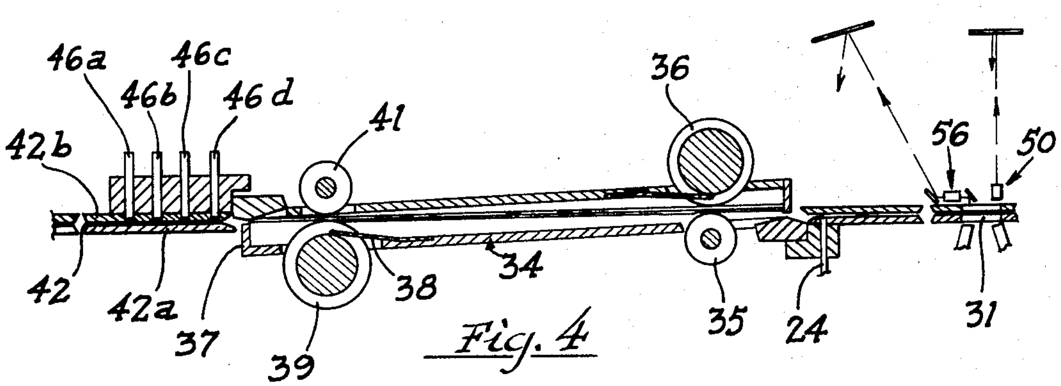

With regard to FIGS. 3, 4, and 5, the recesses 6 and 7 provided in the base portion 1*a* serve as chambers for relieving one of the magazines 13 and 14 respectively. In practice there should be an empty magazine for receiving aperture cards 11 directed along the feed path between the magazines 13 and 14. In the embodiment to be described, an empty magazine 13 is disposed within the recess 6 to receive the aperture cards 11 as they are discharged from the feed path, while the magazine 14 is loaded with a stack of aperture cards 11 and is inserted within recess 7. As long as one of the magazines 13 and 14 is not disposed within its operative position within the reader 1, the aperture cards received within the recesses 6 and 7 are prevented from falling out of the reader by blocking members (not shown) provided on the open side of the magazines 13 and 14 in the form of flaps, for example. Upon insertion of the magazines 13 and 14, a release key or switch is operated manually or automatically to prepare the reader for operation and to thereby withdraw the blocking member extending across the path of movement of the aperture cards 11. Upon insertion of the magazine 14, the front edge of the aperture cards 11 are moved against a stop member 15, which is fixedly mounted within the reader 1, as shown in FIG. 3. In addition, the transport roller 16 is moved from a first or inoperative position to a second or card discharge position, and a hold down member 17 presses the stack of aperture cards 11 so that the topmost card 11 in the magazine 14 is brought into contact with the transport roller 16 to thereby be discharged.

Figure 6:
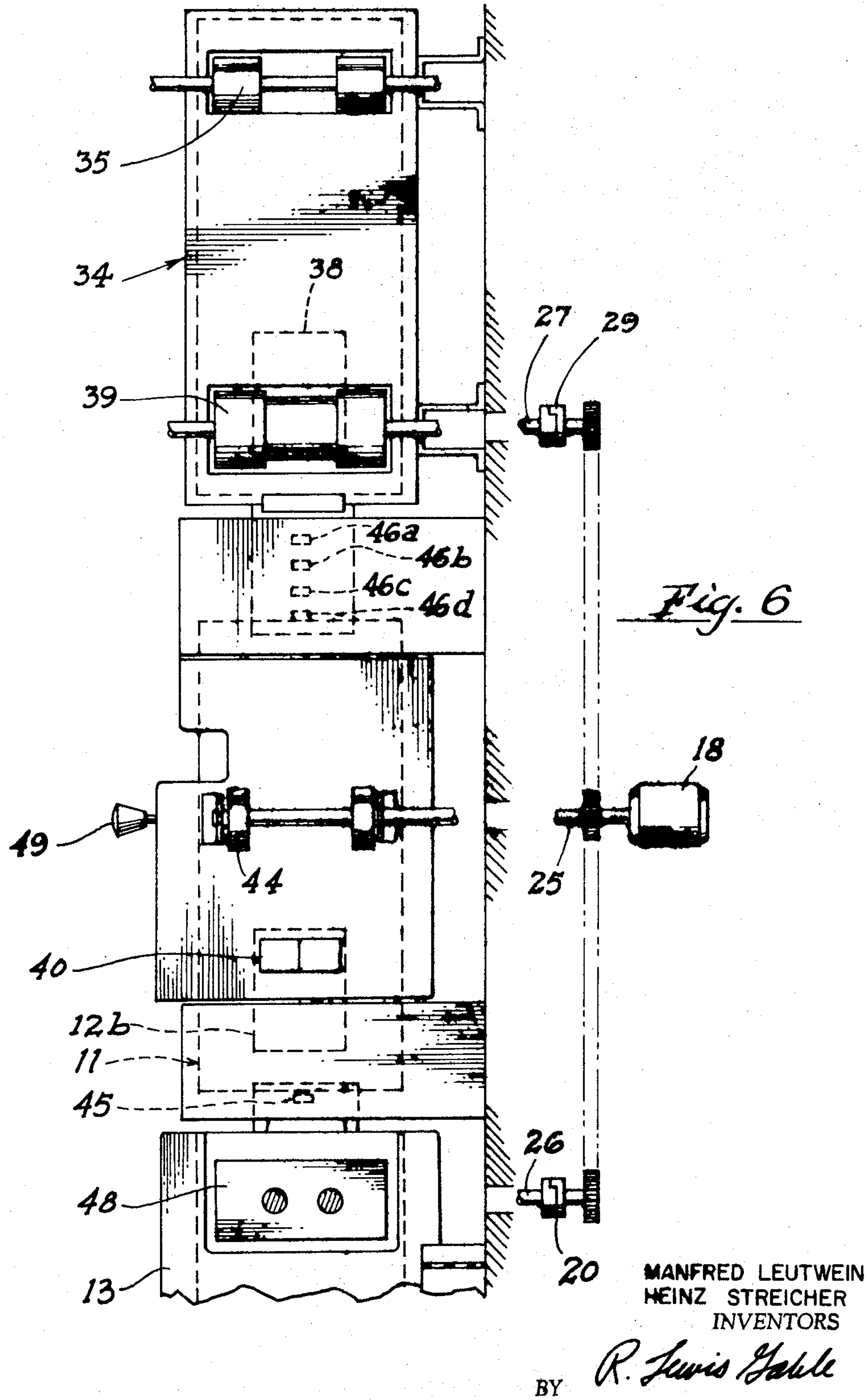
FIG. 6 is a planned view of a modification of the feed path shown in FIGS. 4 and 5.

Each half of the transport mechanism is driven by a reversible motor. The motor for driving the left half of the transport mechanism as shown in FIG. 6 is denoted by the reference number 18. The corresponding driving motor for the right half of the transport system is designated in FIG. 8 by the reference numeral 53. As shown in FIG. 6, the reversible motor 18 is connected respectively through drive or transport shafts 25, 26 and 27 to transport or driver rollers 44, 47 and 41. The transport shafts 26 and 27 may be selectively disengaged from the reversible motor 18 by clutches 20 and 29. Power is supplied to the reader 1 by depressing key or switch 19 disposed upon the control panel 2. More specifically, the switch 19 serves to energize an illumination source or lamp **50*b* associated with a projection lens system 50, and an illumination source or lamp 56*b* associated with a projection lens system 56 (see FIG. 7). As will be described in greater detail later, the film chip 12*b* may be selectively disposed at the projection apertures or film gates 31 and 40 so that selective image portions therefrom may be focused by the projection lens systems 50 and 56 onto the display screens 4 and 5**.

Upon actuation of the proper switch on control panel 2, the reversible motor 53 for the right half of the transport system is energized to rotate the drive roller 16. In turn, the drive roller 16 which may be made of a piece or a plurality of pieces, moves the bottommost aperture card 11 (as seen in FIG. 3) in the magazine 14 through a card gate or opening defined by the stop 15 and a counter lip or throat member 21, into a channel 22. As shown in FIG. 3, the channel 22 is formed by a pair of guide members or plates **22*a* and 22*b*. The dimension of the card gate is approximately the thickness of a single aperture card 11 to thereby permit the passage of only one aperture card 11 at a time. The aperture card 11 is directed through the gate a sufficient distance so that a pair of drive rollers 23 may engage the leading portion of the aperture card 11 and to transport the card 11 to the left as seen in FIG. 3. To prevent the transport roller 16 from continuously discharging aperture cards 11 from the magazine 14, means such as microswitches may be provided to generate a control signal thereby disengaging the reversible motor 53 from the transport roller 16**.

As seen in FIG. 4, a selectively operable stop member 24 may be energized to stop the movement of the aperture cards 11 along the feed path. When the stop member 24 has been disposed in its blocking position across the feed path, the aperture card 11 will be directed against and will be stopped by member 24 so that the aperture card 11 lies substantially within a card channel **22*c* of a carriage 30 with a selected image portion of the film chip 12*a* disposed within a projection aperture or station 31. As a result, the projection system 50 including the lens system 50*a* and the lamp 50*b* will project the selected image portion onto the viewing screen 5. It is noted that the carriage 30 associated with the projection system 50 is similar to a carriage 51 associated with an image projection system 52 (see FIG. 5). If it is desired to project the image portions II to IV onto the viewing screen, the polarity of the potential applied to the reversible motor 53 is reversed by an actuating switch within an assembly 10 of switches disposed on the control panel 2. Further, the assembly 10 of switches selectively operates one of a plurality of stop members 32*a*, 32*b*, 32*c* or 32*d* to effect the movement of the selected member into the channel 22 and to thereby stop the aperture card 11 so that the selected image portion is aligned with the projection aperture 31**.

Figure 8:
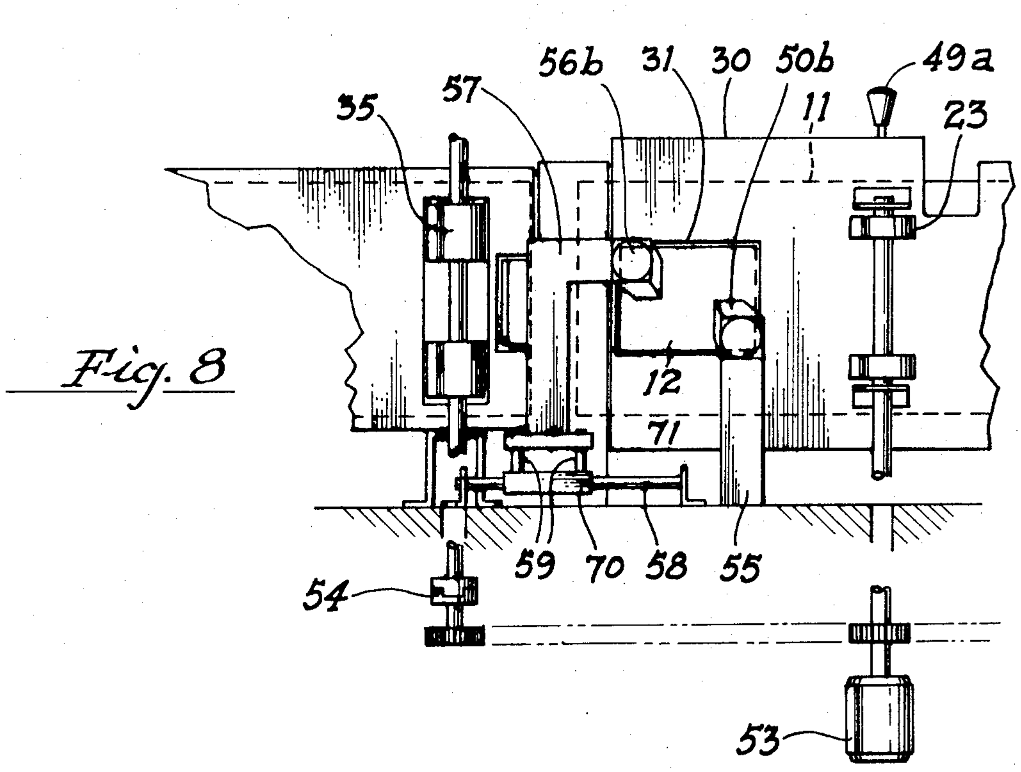
FIG. 8 is a side view of the reading station shown in FIG. 7.

For viewing the image portions V to VIII, the operator may selectively operate one of the switches of the assembly 10 to thereby shift the carriage 30 on which is mounted the pair of drive rollers 23, in an upward direction as seen in FIG. 8 a distance corresponding to the height of one image portion. In a manner similar to that described above, one of the plurality of stop members 32 may be actuated to limit the lateral shifting of the image portions V to VIII to thereby position the desired image portion with respect to the projection aperture 31. In this manner it is possible that each of the image portions I to VIII arranged on a film chip **11*b* to be projected onto the screen 5 by selectively actuating one of the keys of the assembly 10** which are in turn associated with electronic switching and control circuits.

Typically, a complete document or series of pages are microfilmed according to a predetermined scheme. For example, a series of pages may be microfilmed so that the first three, four or five image portions on the film chip **11*b* contain important or distinctive parts of the recorded document e.g. information that would identify the nature of the document. As a result, it would be preferred to design the switching and control circuits for positioning the carriage 30 such that the operator could choose in advance which of the eight image portions of I to VIII is to be automatically projected first onto one of the viewing screens 4 or 5**.

Before directing the aperture card 11 further along the transport mechanism, the carriage 30 is returned to its initial position if the card 11 had been shifted laterally. This operation clears the guide channel 22 so that the aperture card 11 may now be moved forward or backward as desired. As shown in FIG. 8, the carriage 30 may be provided with a control member or handle **49*a* which an operator may manipulate to urge the guide plates defining the carriage 30 apart. The aperture card 11 disposed within the carriage 30 may then be removed or a card may be inserted therebetween. Such an operation would make it possible to vary the sequence in which the aperture cards 11 are stacked in one of the magazines or stations 13 or 14**.

After the selected image portion of the film chip 12 has been aligned with and projected through the aperture 31, the aperture card 11 may be directed from the carriage 30 through a gate or opening 33 into an intermediate magazine or storage station 34. With regard to FIG. 4, as the leading portion of the aperture card 11 enters the operative region of the transport drive roller 35 and a pressure roller 36, a clutch is energized under the control of a microswitch for example, and the aperture card 11 is transported further until it reaches a stop member 37 which provides a surface against which the aperture card 11 abuts. Upon abutting the stop member 37, the rotational torque applied to the drive roller 35 is removed due to the de-energization of a clutch 54 (see FIG. 8). For example, suitable microswitches and control circuitry may be provided to disengage the clutch 54, which in turn disconnects the motor 53 from the transport roller 35. While the intermediate magazine 34 may vary widely according to its storage capacity, it is suggested that the storage capacity be designed to accommodate approximately 35 aperture cards 11. To prevent overfilling of the intermediate magazine 34 and, as a result, the possible jamming of the transport channels leading thereto, a plurality of switches such as microswitches or the like are disposed in the intermediate magazine 34 to prevent additional cards 11 from being transported into magazine 34 and/or to cause cards 11 to be transported out of the magazine 34 when the intermediate magazine 34 is substantially filled.

If an aperture card 11 is to be moved from the intermediate magazine 34 to the left hand viewing position as shown in FIG. 5, the transport roller 41 is rotated to direct the topmost card of the stack from the intermediate magazines 34 through the aligned channels 42 and 43. As seen in FIG. 5, the channels 42 and 43 are respectively defined by guide members **42*a* and 42*b*, and 43*a* and 43*b*. The aperture card 11 will continue to be directed through the channels 42 and 43 until it reaches a pair of transport or drive rollers 44 whereupon the transport roller 41 will cease to be rotated and the aperture card 11 will have passed from the operative region of the transport roller 41 and the pressure roller 39. The aperture card 11 will be moved to the left as seen in FIGS. 4 and 5 until the front edge of the aperture card 11 abuts a selectively operable stop member 45, which serves to block the path of the aperture card 11 along the feed path. In this position, a selected image portion of the film chip 12*b* will be disposed in alignment with the projection aperture 40 so that the selected image portion may be projected by the projection lens system 52 onto the display screen 4. Further, the aperture card 11 may be shifted laterally by means of an assembly 9 of control switches disposed upon the control panel 2, which in a manner similar to that described above controls the movement of the second carriage 51 and a plurality of stop members 46*a*, 46*b*, 46*c* and 46*d*. More specifically, the position of the aperture card 11 with respect to the projection aperture 40 is controlled by actuating one of the stop members 46 and, by selectively moving the second carriage 51, and therefore the aperture card 11**, in a direction transverse to the feed path.

The aperture cards 11 may be successively moved from the viewing position as defined by the projection aperture 40 into the left hand magazine 13 (as seen in FIG. 5) by driving the pair of transport rollers 44 to thereby move the aperture card 11 into an engaging position with the transport roller 47. In turn, the transport roller 47 will grip the incoming aperture card 11 and will move the aperture card into the magazine 13, where a counter holder or hold down member 48 exerts a resilient pressure through the stack of aperture cards 11 onto the transport roller 47.

The direction of card movement may be controlled either as a unit or as separate parts, which may be reversed at the discretion of the operator. More specifically, the rotation of the transport rollers 16, 35, 41, 47, 23 and 44 may be reversed by applying a potential of a different polarity to the drive motors 18 and 53. With regard to FIGS. 3 and 5, it may be noted that the transport rollers 16 and 47 may be selectively disposed from a first position remote from the stacks of cards to permit the cards to be inserted into the magazines 13 and 14, to a second position whereat the transport rollers 16 and 47 each engage the topmost card in the stack.

Thus, it is apparent that either magazine 13 or 14 may serve as a deposit magazine, depending on whether the aperture cards 11 are transported to the left or right as seen in FIGS. 3, 4 and 5. When all the aperture cards 11 constituting a card series are received in a single magazine, that magazine may be removed from the reader 1 and placed into storage. It is particularly important that the sequence of the cards 11 in the magazine not be altered as the card is transported through the reader 1. As a result, to properly store and identify an entire stack of cards it would be sufficient to mark the first card in a series with appropriate indicia and to provide an aperture within the magazines so that the indicia may be easily viewed.

However, the fixed sequence of aperture cards 11 may be interrupted if desired so that a regrouping or an exchange of cards may be affected within the carriages 30 and 51. More specifically, lever arrangements are provided which may be operated by means of a handle or knob **49*a* or 49*b* to separate portions of the respective carriages 30 and 51 so that a card 11 disposed within the carriage may be withdrawn or that a new aperture card 11 may be inserted therein. In addition, the intermediate magazine 34 may be designed as a feed mechanism adapted for the exchange of aperture cards 11. Thus, it would be possible to vary the composition and/or order of the stacked cards 11** within the magazines.

The reader 1 in accordance with the teachings of this invention is capable of successively conveying aperture cards 11 from one stack of cards along a feed path past a first viewing position, an intermediate storage magazine 34, a second viewing position to a stack of cards at the other end of the transport mechanism. If desired, the reader 1 may make it possible to project an image portion from a plurality of image portions stored on film chip **12*b* or to project simultaneously the selected combination of image portions disposed on different aperture cards 11 onto the display screens 4 and 5**.

Figure 7:
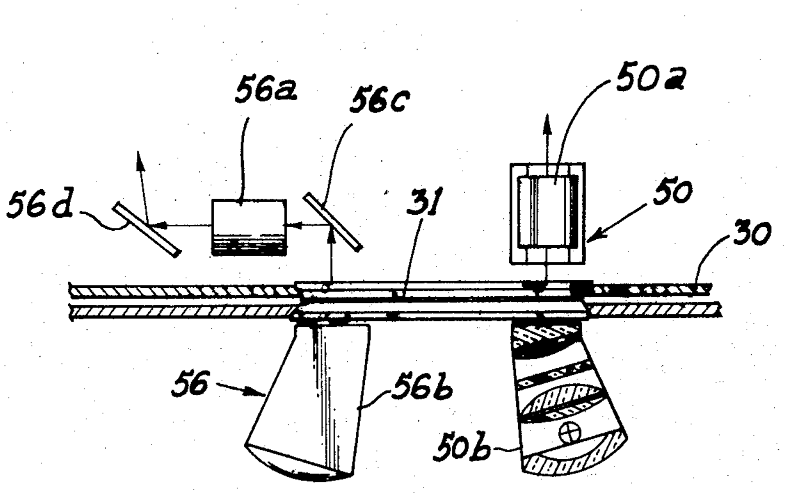
FIG. 7 is a plan, sectioned view of a reading station having two image projection systems to be incorporated in the reader of FIG. 1.
Figure 9:
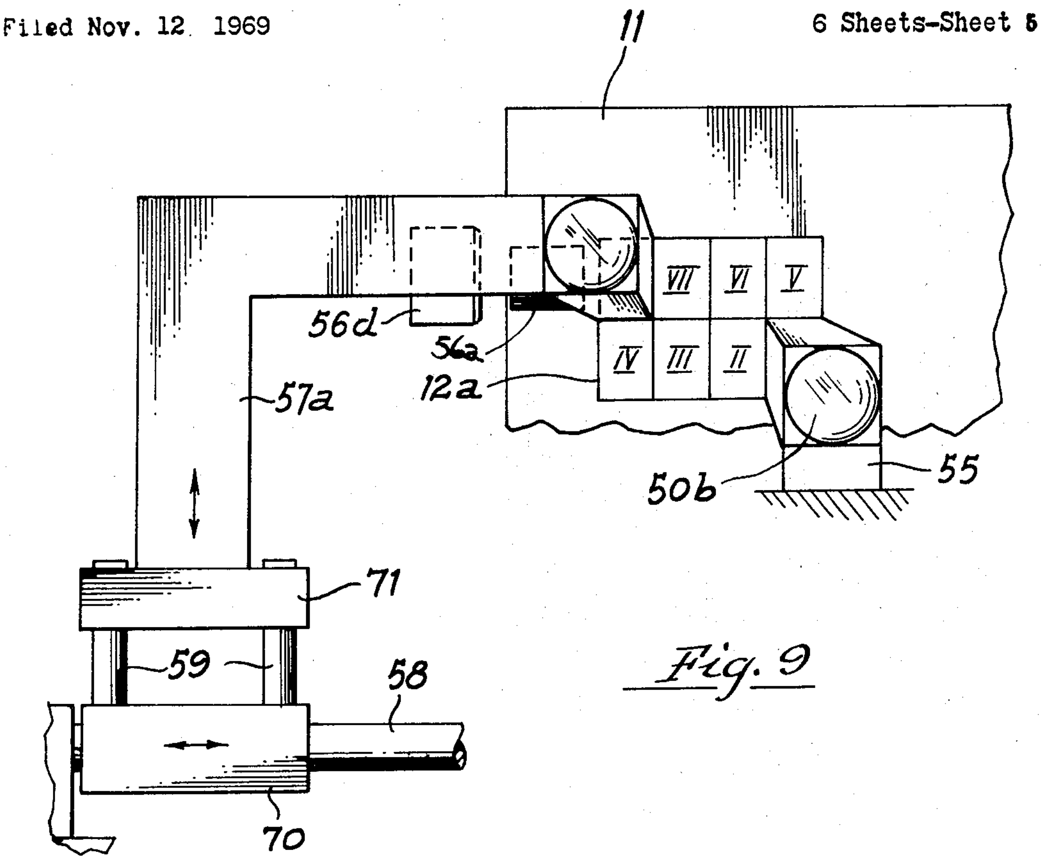
FIGS. 9 and 10 are respectively enlarged front and side views of the projection systems shown in FIG. 8.
Figure 10:
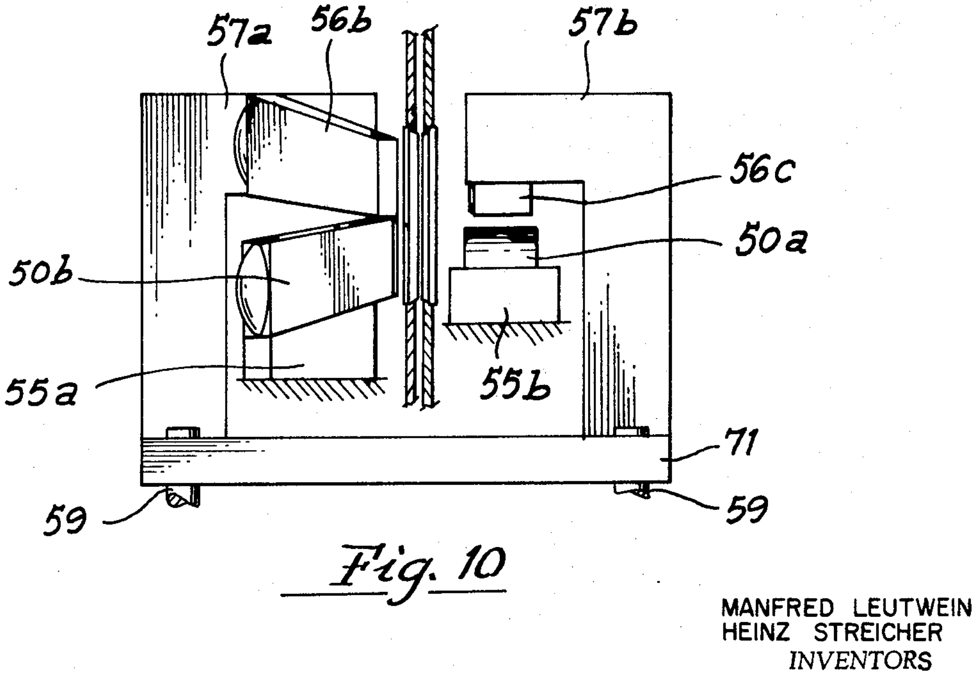

If the document to be microfilmed does not exceed eight pages of text and drawings, the document may be recorded on a single aperture card 11 as shown in FIG. 2. Thus, it may be desirable or necessary to simultaneously view one or more images from the same aperture card 11 without providing a duplicate of the aperture card to be projected. Thus, in accordance with the teachings of this invention at least one of the reading stations as defined by projection apertures 31 and 40 is provided with a plurality of image projection systems. In a preferred embodiment of this invention as shown in FIGS. 7, 8, 9 and 10, the projection aperture 31 is provided with two projection lens systems 50 and 56. The projection lens system 50 includes the projection lens **50*a* disposed on one side of the projection aperture 31 and the projection lamp 50*b* disposed on the other side of the aperture 31. As shown in FIG. 10, the lens 50*a* and the lamp 50*b* are disposed in a stationary relationship and are fixedly supported respectively by support members 55*a* and 55*b* respectively. In contrast, the second projection lens system 56 is movably mounted with respect to the projection aperture 31 and includes the projection lens 56*a* disposed on one side of the aperture 31 and the illumination source or lamp 56*b* disposed on the other side of the aperture 31. As shown in FIGS. 7 and 10, a pair of mirrors or reflective surfaces 56*c* and 56*d* are associated with the projection lens 56*a* for directing the projected image from the film chip 12*b* onto the viewing screen 4. As shown in FIGS. 8 and 9, the projection lens system 56 is mounted upon a support member 57. As shown in FIG. 10, the projection lens 56*a* is mounted upon the support member 57*a* and the reflective surface or mirror 56*c* is mounted upon the support member 57*b*. In turn the support members 57*a* and 57*b* are supported on a sliding shoe 71. As seen in FIGS. 8 and 9, the sliding shoe 71 has a pair of apertures therein for receiving a pair of guide studs 59 along which the sliding shoe and as a result the projection lens system 56 may be readily moved in a rectilinear motion. Further, the guide studs 59 are fixed to a sliding shoe 70 which may be moved in a horizontal direction on a pair of guide rods or support members 58. Reference is made to the above identified, copending application entitled, "Reader For Information Carriers in Sheet Form" to Streicher, Rick and Leutwein for a further description of a mechanism for moving the lens projection system 56 with respect to the film chip 12*b*. In this application, the movement of the projection lens system 56 may be controlled manually through a linkage and a knob. In the alternative, the desired adjustment of the projection lens system 56** may be affected by a motor which may be controlled electronically by suitable circuits.

Figure 11:
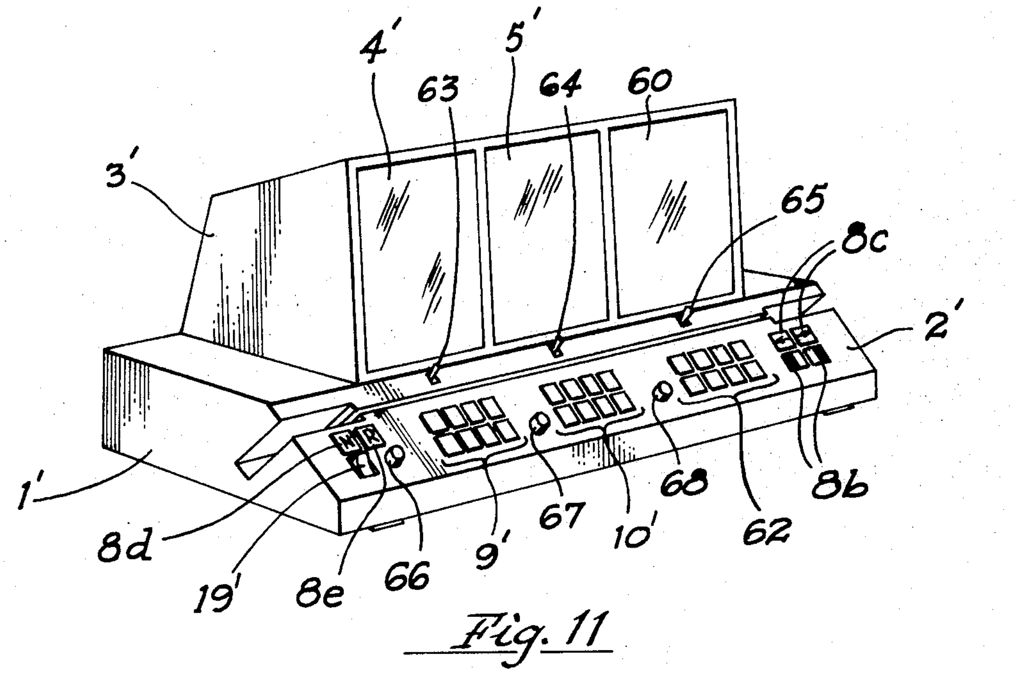
FIG. 11 is a perspective view of a reader in accordance with this invention including three lens systems and three projection screens or display surfaces.
Figure 12:
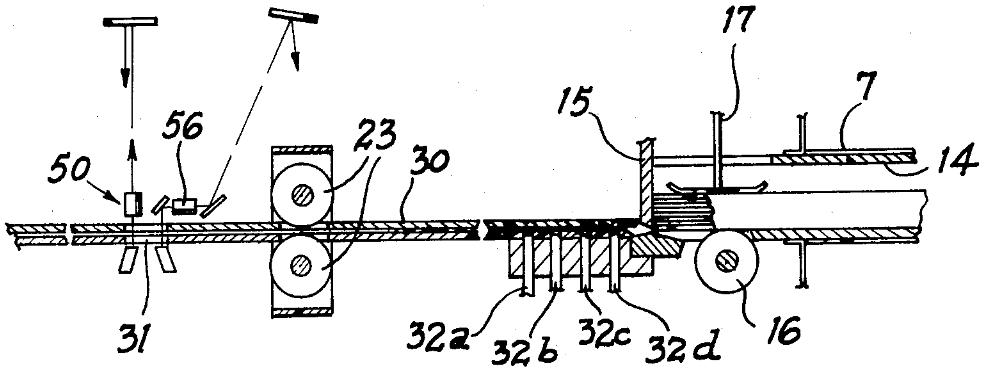
FIG. 12 is a side view of a reading station including two projection lens systems, one being stationery and the other being movable to be incorporated into the reader shown in FIG. 11.

If as shown in FIG. 12, the movable projection lens system 56 is disposed in combination with the projection lens system 50 to project various image portions of the film chip **12*b* disposed within the projection aperture 31, three image portions may be viewed at a single time. More specifically, the reader 1 shown in FIG. 11 includes a third projection screen or display surface 60 for receiving the image projected from the movable projection lens assembly 56**.

With regard to FIG. 1, the control signal for the feeding and movement of aperture cards 11 are initiated by switches on the control panel 2. The control panel 2 is provided with an on-off switch 19, whose function has been described above, and three control assemblies 8, 9 and 10. The viewing screen 5 may be associated with the stationary projection lens system 50 and the movable projection lens system 56 may be associated with the display screen 4. As described above, each of the assemblies 9 and 10 include a plurality of switches which may be actuated to selectively project one of the image portions I to VIII of the photographic film chip 12*b* onto its respective display screen. The knobs 8*a* and 8*f* serve to focus the projection lenses 50*a* and 56*a*. The keys or switches 8*b* are used for selective operation of either the right or left hand portions of the transport system as well as for controlling the feeding means associated with the intermediate magazine 34. In addition, the keys or switches 8*c* may be actuated in accordance with the arrows displayed thereon to affect the forward and reverse movement of the aperture cards 11 along the feed path. An actuation of a key or switch 8*d* marked N permits the normal operation of the transport system whereas the depression of key or switch 8*e* and marked R will affect a clearing operation of the transport mechanism. As explained above, the switches of the assembly 9 may be actuated to control the selective projection of the images stored on the aperture card 11 positioned at the projection aperture 40 while the switches or keys of the assembly 10 are associated with the selective projection of the image portions of the aperture card 11 positioned at the projection aperture 31. After an aperture card 11 has been aligned with the aperture 31, a key or switch 69 is first depressed to permit the projection of the selected image onto the viewing screen 5 by means of the stationary projection lens system 50 and in addition, to project another selected image by the projection lens system 52 onto the screen 4. On the other hand, two image portions of a single aperture card 11 disposed at the projection aperture 31 may be projected by the stationary projection lens system 50 and the movable projection lens system 56 by first actuating a key or switch 61, which is associated with the movable projection lens system 56. By the actuation of the switch 61, the projection lens system 52 associated with the projection aperture 40 is automatically de-energized and the image aligned with the movable projection lens system 56 is directed onto the projection screen 4. In addition, the actuation of switch 61 permits the control assembly 9 to operate the movable lens projection system 56 as opposed to operating the carriage 51 as described above. Further, the aperture card 11 may be moved into alignment with the projection aperture 31 and the stationary projection lens system 50 by the actuation of the appropriate switch of the assembly 10. Next, the selected key of the assembly 9 is thrown to thereby position the movable projection lens system 56 with respect to the second image portion.

It may be understood that certain difficulties may occur because of the necessary support structure when it would be tempted to position the projection lens systems 50 and 56 in certain positions with respect to the aperture card 11. For example, if the operator actuates the key or switch of the assembly 10 corresponding to the image portion VI, the aperture card 11 will be first moved downwardly by the height of one image and thereafter moved laterally the distance of one image to the right (provided that the stationary projection lens system 50 was initially located in front of the image portion I). Now, the image portion VI will appear on the display screen 5. If now the operator presses the switch or key in the assembly 9 corresponding to the image portion I, the movable projection lens system 56 might move stepwise towards image portion I of the film chip 12*b*. However, this practically impossible because the movable lens projection system 56 will be blocked by the stationary projection lens system 50 which is disposed in the path of the projection lens system 56. Consequently, the combination of control signals imparted to the reader 1 through assemblies 9 and 10 should be blocked. In this case the reader 1 will be automatically switched over in a known manner by means of suitable logic circuitry so that the aperture card 11 is moved so that the image portion I will be in line with the stationary projection lens system 50, and the movable projection lens system 56 is moved automatically into alignment with the image portion VI. Thus, both image portions VI and I can be viewed on display screens 4 and 5 through the use of logic circuitry which senses the conflict in signals and provides the control signals to the separate mechanisms for controlling the movement of the lens systems 50 and 56.

With regard to FIGS. 11 and 12, if the movable projection lens system 56 is disposed to the right of the stationary lens system 50, it is possible when using a third screen 60 to simultaneously project and compare three image portions. For example, the image portion on aperture card 11 aligned with the projection aperture 40 will appear on the viewing screen 4 and may be compared with two other image portions of a second aperture card aligned with the projection aperture 31 to be projected onto the screens 5 and 6 by projection systems 50 and 56. In the reader 1 shown in FIG. 12, the movable projection system 56 is associated with an assembly of switches 62 disposed upon the control panel 2 to select the proper image portion to be displayed upon the display screen 60. Switch 65 controls the energization of the lamp 56*b* associated with the projection lens system 56. The switches 63 and 64 serve in a similar manner to turn on the projection systems 52 and 50. In contrast to the arrangement shown in FIG. 1, the assembly 8 of controls shown upon the reader 1 differs as to the location; however, the function of these switches remains the same as that described with respect to the switches of FIG. 1. Further, the rotary knobs 66, 67 and 68 serve to focus the lenses of the projection lens systems 50, 52 and 56.

In one illustrative embodiment of this invention, the automatic scanning or surveying of the material recorded upon the stack of aperture cards 11 may be accomplished by placing on the first aperture card of such a stack a suitable coding mark which may be sensed mechanically, magnetically, photoelectrically or in any other known manner. Illustratively, the scanning or sensing means may be disposed between the carriages 30 and 51, and the intermediate magazine 34. When the scanning or sensing members are operated to sense the coding marks, the first card in a series, which are related to a given subject matter, will be automatically stopped in the viewing position with respect to the projection aperture while the remaining aperture cards will be continuously directed along the feed path. In this manner, the operator may quickly search a great number of aperture cards without having to look at each card in order to determine whether a document or series of cards is to be displayed.

The invention has been described in detail with particular reference to preferred embodiments thereof, but it will be understood that variations and modifications can be affected within the spirit and scope of the invention.

We claim:

1. Apparatus for projecting images from an information bearing medium having first, second and third image portions, said apparatus comprising:
   - first and second stations for receiving a plurality of information bearing media;
   - a feed path disposed between said first and second stations;
   - a third station for receiving a plurality of the image bearing media, said third station disposed along said feed path between said first and second stations;
   - conveying means for directing the information medium along said feed path;

first and second projection stations for receiving the information bearing medium as it is directed along said feed path; and first and second projecting means disposed with respect to said first projection station for respectively projecting images of the first and second image portions of the information bearing medium, said first projecting means being movably supported for selective disposition so as to project the image from the third image portion.

2. Apparatus as claimed in claim 1, wherein said second projecting means is disposed in a fixed relationship with respect to said feed path.

3. Apparatus as claimed in claim 1, wherein said third station is disposed between said first and second projection stations.

4. Apparatus as claimed in claim 3, wherein said third station is disposed at the approximate center of said feed path.

5. Apparatus as claimed in claim 1, wherein there is included insertion means for facilitating the insertion and/or removal of information bearing media into or from said feed path.

6. Apparatus as claimed in claim 1, wherein there is included first and second display surfaces upon which said first and second means for projecting may direct images derived from the first and second image portions.

7. Apparatus as claimed in claim 6, wherein there is included third projecting means disposed with respect to said second projection station for projecting an image derived from an information bearing medium having an image portion disposed at said second projection station.

8. Apparatus as claimed in claim 7, wherein said third projecting means directs the image portion disposed at said second projection station onto said second display surface.

9. Apparatus as claimed in claim 1, wherein there is included third means for projecting; and, first, second and third display surfaces for respectively receiving the images from said first, second and third means for projecting.

10. Apparatus as claimed in claim 1, wherein there is included first and second magazines fer receiving a plurality of the information bearing media, said first and second magazines being disposable into said first and second stations respectively and being removable therefrom for storing the plurality of the information bearing media in a fixed sequence.

11. Apparatus as claimed in claim 1, wherein said feed path includes carriage means disposed to receive the information bearing medium for moving the received information bearing medium with respect to said first projection station.

12. Apparatus as claimed in claim 11, wherein there is included stop means for blocking the movement of the information bearing medium along said feed path at discrete points with respect to said first projection station.

13. Apparatus as claimed in claim 1, wherein said conveying means may selectively move the information bearing medium in a first direction from said first station to said second station and in a second direction from said second station to said first station.

14. Apparatus for projecting images from an information bearing medium having first, second and third image portions, said apparatus comprising:

first and second stations for receiving a plurality of the information bearing media;

a feed path disposed between said first and second stations;

conveying means for directing the information bearing medium along said feed path;

first and second projection stations for receiving the information bearing medium as it is directed along said feed path;

first and second projecting means disposed with respect to said first projection station for respectively projecting images of the first and second image portions of the information bearing medium, said first projecting means being movably supported for selective disposition so as to project the image from the third image portion;

display surface means upon which said first and second projecting means may project images derived from the first and second image portions;

third projecting means disposed with respect to said second projection station for projecting an image derived from an information bearing medium having an image portion disposed at said second projection station onto said display surface means.

15. The apparatus of claim 14 wherein said display surface means comprises first and second display surfaces, wherein said images derived from the first and second image portions are projected onto said first display surface and wherein said image derived from the information bearing medium at said second projection station is projected onto said second display surface.

16. Apparatus for projecting images from an information bearing medium having first, second and third image portions, said apparatus comprising:

first and second stations for receiving a plurality of the information bearing media;

a feed path disposed between said first and second stations;

conveying means for directing the information bearing medium along said feed path;

first and second projection stations for receiving the information bearing medium as it is directed along said feed path;

first and second projecting means disposed with respect to said first projection station for respectively projecting images of the first and second image portions of the information bearing medium, said first projecting means being movably supported for selective disposition so as to project the image from the third image portion;

third projecting means disposed with respect to said second projection station for projecting images from an information bearing medium at said second station; and first, second and third display surfaces for respectively receiving the images from said first, second and third projecting means.

References Cited

UNITED STATES PATENTS

| | | | |
|---|---|---|---|
| 2,653,511 | 9/1953 | Correa | 353—9 |
| 2,904,914 | 9/1959 | Trubert | 353—113 |
| 2,914,985 | 12/1959 | Badalich | 353—9 |
| 2,933,979 | 4/1960 | Lacoe | 353—113 |
| 2,968,217 | 1/1961 | Ewald | 353—7 |
| 3,183,765 | 5/1965 | Offensend et al. | 353—26 |

WILLIAM D. MARTIN, Jr., Primary Examiner

U.S. Cl. X.R.

353—113